United States Patent
Ishii et al.

(10) Patent No.: US 8,199,137 B2
(45) Date of Patent: Jun. 12, 2012

(54) OPTICAL RECORDING APPARATUS, OPTICAL RECORDING METHOD, AND IMAGE DISPLAY APPARATUS

(75) Inventors: Tsutomu Ishii, Kanagawa (JP); Minoru Koshimizu, Kanagawa (JP); Naoki Hiji, Kanagawa (JP); Yasunori Saito, Kanagawa (JP); Haruo Harada, Kanagawa (JP); Masahiro Sato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 915 days.

(21) Appl. No.: 11/907,225

(22) Filed: Oct. 10, 2007

(65) Prior Publication Data

US 2008/0239174 A1    Oct. 2, 2008

(30) Foreign Application Priority Data

Mar. 29, 2007    (JP) ................................. 2007-089424

(51) Int. Cl.
  *G06F 3/038* (2006.01)
  *G09G 5/00* (2006.01)
  *G09G 3/00* (2006.01)
  *G09G 3/38* (2006.01)
  *G02F 1/13* (2006.01)
  *G02F 1/1335* (2006.01)

(52) U.S. Cl. ............ 345/204; 345/697; 345/30; 345/31; 345/87; 345/102; 349/1; 349/2; 349/12; 349/56; 349/115

(58) Field of Classification Search .............. 345/87–89, 345/204, 207; 349/1–2, 12
See application file for complete search history.

(56) References Cited

U.S. PATENT DOCUMENTS

| | | | |
|---|---|---|---|
| 5,329,390 A * | 7/1994 | Fujiwara et al. | 349/27 |
| 6,037,922 A | 3/2000 | Yagyu | |
| 6,452,088 B1 * | 9/2002 | Schmidt | 136/244 |
| 7,605,896 B2 * | 10/2009 | Su | 349/129 |
| 2002/0118400 A1 * | 8/2002 | Koshimizu et al. | 358/472 |
| 2002/0119279 A1 * | 8/2002 | Ogawa | 428/64.4 |
| 2005/0162500 A1 * | 7/2005 | Nose et al. | 347/118 |
| 2006/0012591 A1 * | 1/2006 | Suguro | 345/204 |

FOREIGN PATENT DOCUMENTS

| | | |
|---|---|---|
| JP | A-03-021924 | 1/1991 |
| JP | A-09-073067 | 3/1997 |
| JP | A-11-237644 | 8/1999 |
| JP | A-2004-061744 | 2/2004 |
| WO | WO 2004/068230 A1 | 8/2004 |
| WO | WO 2005/122124 | * 12/2005 |

* cited by examiner

OTHER PUBLICATIONS

Jan. 10, 2012 Office Action issued in Japanese Patent Application No. 2007-089424 (with translation).

*Primary Examiner* — Nitin Patel
*Assistant Examiner* — Alecia D English
(74) *Attorney, Agent, or Firm* — Oliff & Berridge, PLC

(57) ABSTRACT

An optical recording apparatus and a method of optical recording are disclosed in which: a DC voltage of a first polarity is applied, as a reset voltage for initializing a display layer, to one of a plurality of divided electrodes which is selected in a predetermined sequence along a specified direction, and reset light is irradiated onto a photoconductor layer in a region corresponding to the selected divided electrode; and a DC voltage of a second polarity opposite to the first polarity is applied, as an image writing voltage for writing an image in the display layer, to the selected divided electrode, and image light corresponding to input image information is irradiated onto the photoconductor layer in the region corresponding to the selected divided electrode. Also disclosed is an image display apparatus including the optical recording apparatus.

14 Claims, 9 Drawing Sheets

PLANAR

FOCAL CONIC

HOMEOTROPIC

US 8,199,137 B2

OPTICAL RECORDING APPARATUS, OPTICAL RECORDING METHOD, AND IMAGE DISPLAY APPARATUS

CROSS-REFERENCE TO RELATED APPLICATION

This application claims priority under 35 USC 119 from Japanese Patent Application No. 2007-89424 filed Mar. 29, 2007.

BACKGROUND

1. Technical Field

The present invention relates to an optical recording apparatus, an optical recording method, and an image display apparatus.

2. Related Art

A variety of technologies have been disclosed in relation to optical writing type image display medium having a memory function that the medium retains the displayed image after removal of the electrical power for writing, and to a process for recording an image in such image display medium.

SUMMARY

The present invention provides an optical recording apparatus and method, capable of recording images uniformly in an optical writing type image display medium, and an image display apparatus using such optical recording apparatus and method.

According to an aspect of the invention, there is provided an optical recording apparatus for recording an image in an optical writing image display medium comprising a display layer having a memory function and configured to reflect incident light selectively depending on an applied voltage, a photoconductor layer whose electrical resistance changes depending on irradiated writing light, and a pair of electrodes composed of a plurality of divided electrodes and having the display layer and the photoconductor layer interposed therebetween, at least one electrode of the pair of electrodes being arranged in parallel along a specified direction, the apparatus comprising: an electrode selection unit that selects any one of the plurality of divided electrodes according to a predetermined sequence along the specified direction; a first light irradiation unit that irradiates reset light for initializing the display layer onto the photoconductor layer in a region corresponding to the one of the divided electrodes selected by the electrode selection unit; a second light irradiation unit that irradiates image light corresponding to input image information onto the one of the divided electrodes selected by the electrode selection unit; a relative feeding unit that causes the optical writing type image display medium and a light irradiation section that includes the first and second light irradiation units to be fed relatively along the specified direction; a first voltage application unit that applies a DC voltage of a first polarity, as a reset voltage for initializing the display layer, to the one of the divided electrodes selected by the electrode selection unit; a second voltage application unit that applies a DC voltage of a second polarity opposite to the first polarity, as an image writing voltage for writing an image in the display layer, to the one of the divided electrodes selected by the electrode selection unit; and a control unit that controls the first voltage application unit and the first light irradiation unit such that the reset voltage is applied to the one of the divided electrodes selected by the electrode selection unit and the reset light is irradiated onto the photoconductor layer in the region corresponding to the one of the divided electrodes selected by the electrode selection unit, and further controls the second voltage application unit and the second light irradiation unit such that the image writing voltage is applied to the one of the divided electrodes selected by the electrode selection unit and the image light is irradiated onto the photoconductor layer in the region corresponding to the one of the divided electrodes selected by the electrode selection unit.

BRIEF DESCRIPTION OF THE DRAWINGS

Exemplary embodiments of the present invention will be described in detail based on the following figures, in which.

DETAILED DESCRIPTION

An exemplary embodiment of the invention is described below.

Figure 1:
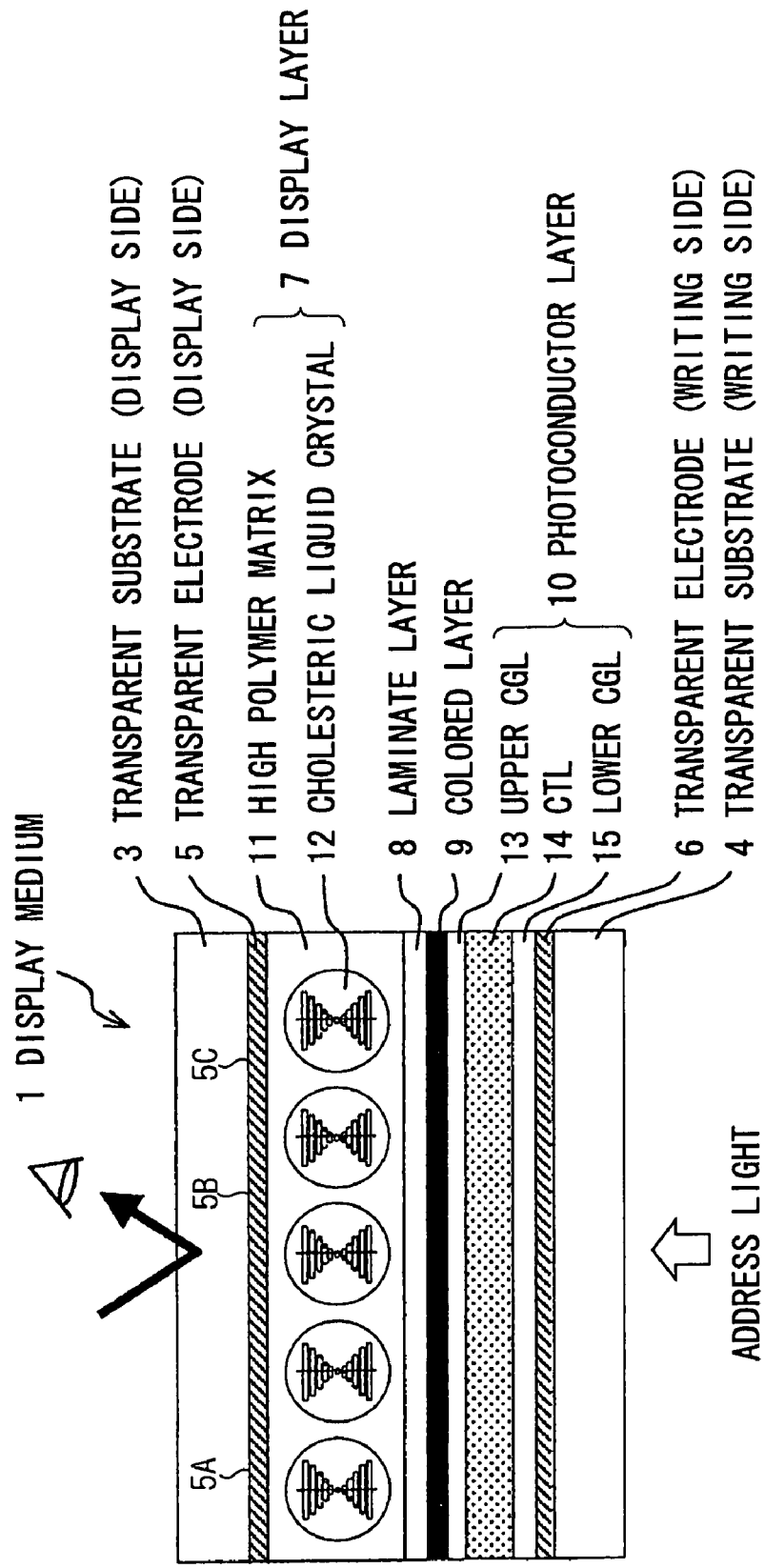
FIG. 1 is a sectional view of an image display medium.

FIG. 1 is a sectional view of an optical writing type display medium 1 according to the exemplary embodiment. The display medium 1 is a display medium capable of recording an image in response to irradiation of an address light corresponding to the image and application of a bias signal (voltage).

As shown in FIG. 1, the display medium 1 has a structure in which a transparent substrate 3, a transparent electrode 5, a display layer (liquid crystal layer) 7, a laminate layer 8, a colored layer (light shielding layer) 9, an optical conductor layer 10, a transparent electrode 6, and a transparent substrate 4 are layered in the named order as viewed from the display surface side The transparent substrates 3, 4 hold respective function layers in inner surfaces, and maintain the structure of display medium. The transparent substrates 3, 4 formed of sheet materials having sufficient strength to withstand external force, and the transparent substrate 3 on the display surface side passes at least the incident light, and the transparent substrate 4 on the writing surface side passes at least the address light. The transparent substrates 3, 4 preferably have flexibility. Specific materials include inorganic sheet (e.g. glass silicon), and high polymer film (e.g. polyethylene terephthalate, polysulfone, polyether sulfone, polycarbonate, polyethylene naphthalate). On the outer surface may be formed a known functional film such as contamination preventive film, antiwear film, light reflection preventive film, or gas barrier film.

In present exemplary embodiment, the transparent substrates 3, 4 are permeable to light in the whole visible range, and may be permeable only to light in a display wavelength range.

Figure 2:
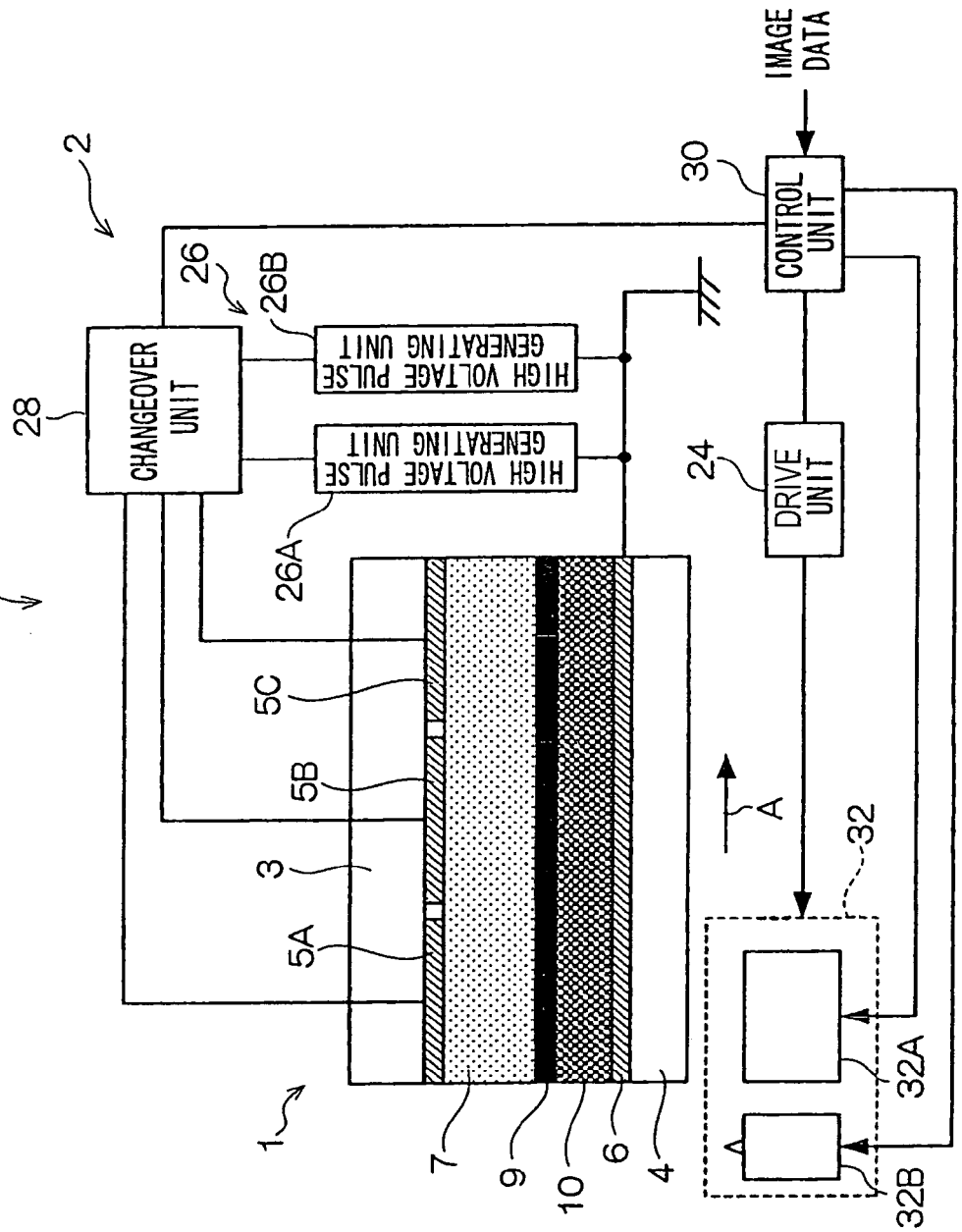
FIG. 2 is a schematic block diagram of an image display apparatus.

The transparent electrodes 5, 6 are for applying a bias voltage applied from the optical recording apparatus 2 shown in FIG. 2 into respective function layers in the display medium 1. In the present exemplary embodiment, by way of example, the transparent electrode 5 is composed of three divided electrodes 5A, 5B, 5C of substantially the same shape (for example, rectangular shape), and the transparent electrode 6 is composed of a single transparent electrode having an area corresponding to the substantially entire area of the display medium 1. The transparent electrodes 5, 6 have a surface-uniform conductivity, and the transparent electrode 5 on the display surface side passes at least the incident light while the transparent electrode 6 on the writing surface side passes at least the address light. Specifically, examples of these electrodes may include conductive thin films formed of, for example, metal (e.g. gold or aluminum), metal oxide (e.g. indium oxide, tin oxide or indium tin oxide (ITO)), or conductive organic high polymer (e.g. polythiophene system or polyaniline system). On the surface may be formed any known functional film such as adhesion improving film, light reflection preventive film, or gas barrier film.

In the present exemplary embodiment, the transparent electrodes 5, 6 are permeable to light in the whole visible range, and may be permeable only to light in a display wavelength range.

The display layer 7 has a function of modulating the reflection and transmittance of specific color light of the incident light depending on the electric field, and is capable of maintaining a selected state under a condition in which no field exists. Preferably, the display layer 7 has a structure that is undeformable against external forces such as bending and pressure.

In the present exemplary embodiment, by way of example, the display layer 7 is formed by a liquid crystal layer of self-supporting type liquid crystal complex composed of cholesteric liquid crystal and transparent resin. Having the self-supporting nature, the liquid crystal layer requires no spacer or the like, however, the invention is not limited thereto. In the exemplary embodiment, as shown in FIG. 1, the cholesteric liquid crystal 12 is dispersed in the high polymer matrix (transparent resin) 11.

The cholesteric liquid crystal 12 has a function of modulating the reflection and transmittance of specific color light of the incident light, wherein liquid crystal molecules are oriented in a spirally twisted state and interfere with and reflect specific light, which depends on the spiral pitch, of the light entering from the spiral axis direction. The orientation of the liquid crystal molecules is varied by electric field, so that the reflection state can be changed. Preferably, the liquid crystal molecules are uniform in drop size and disposed densely in a single layer.

Specific examples of liquid crystal usable as cholesteric liquid crystal 12 include nematic liquid crystal, smectic liquid crystal (e.g. Schiff base system, azo system, azoxy system, ester benzoate system, biphenyl system, terphenyl system, cyclohexyl carboxylic ester system, phenyl cyclohexane system, biphenyl cyclohexane system, pyrimidine system, dioxane system, cyclohexyl cyclohexane ester system, cyclohexyl ethane system, cyclohexane system, tolan system, alkenyl system, stilbene system, condensed polycyclic system), or their mixtures combined with chiral agent (e.g. steroid system cholesterol derivative, Schiff base system, azo system, ester system, biphenyl system).

The spiral pitch of cholesteric liquid crystal is adjusted by the adding amount of chiral agent with respect to the nematic liquid crystal. For example, for producing blue, green and red display colors, the central wavelengths of respective selected reflections are adjusted to be in a range of 400 nm to 500 nm, 500 nm to 600 nm, and 600 nm to 700 nm, respectively. In order to compensate for the temperature-dependence of spiral pitch of the cholesteric liquid crystal, a known technique may be used in which plural chiral agents exhibiting reverse temperature dependence are added.

The configuration in which the display layer 7 forms a self-holding type liquid crystal complex composed of cholesteric liquid crystal layer 12 and high polymer matrix (transparent resin) 11 may use a PNLC (polymer network liquid crystal) structure in which a network resin is contained in a continuous phase of cholesteric liquid crystal or a PDLC (polymer dispersed liquid crystal) structure in which cholesteric liquid crystal is dispersed in a form of droplet in a high polymer skeleton (including a microcapsule structure). The use of a PNLC structure or PDLC structure results in an anchoring effect being produced at the interface between the cholesteric liquid crystal and the high polymer, so that the holding state of planar phase or focal conic phase under a condition in which no electric field exists can be made more stable.

The PNLC structure or PDLC structure may be formed by any known method for phase separation of high polymer and liquid crystal, such for example as: a PIPS (polymerization induced phase separation) method in which liquid crystal is mixed with a high polymer precursor that is polymerizing with heat, light, or electron ray such as acrylic system, thiol system, or epoxy system and the polymerization is carried out in a uniform phase state so as to achieve phase-separation; an emulsion method in which liquid crystal is mixed with high polymer, for which liquid crystal exhibits a low degree of dissolution, such as polyvinyl alcohol and the mixture is agitated, suspended and droplet-dispersed in high polymer; a TIPS (thermally induced phase separation) method in which thermoplastic high polymer and liquid crystal are mixed and the mixture is heated in a uniform phase and then cooled so as to achieve phase-separation; and a SIPS (solvent induced phase separation) method in which high polymer and liquid crystal are dissolved in a solvent such as chloroform and then the solvent evaporated so as to achieve phase-separation between the high polymer and the liquid crystal. However, the present invention is not limited to these methods.

The high polymer matrix 11 has a function of holding the cholesteric liquid crystal 12, and suppressing the flow of liquid crystal (change of image) due to deformation of display medium, and suitably uses a high polymer material which is not dissolved in liquid crystal material and for which a liquid that does not cause the high polymer material to be co-dissolved with liquid crystal serves as a solvent. Further, preferably, the high polymer matrix 11 uses a material having a strength enough to withstand an external force, and exhibiting a high permeability at least with respect to reflected light and address light.

Examples of material usable for the high polymer matrix 11 include a water-soluble high polymer material (e.g. gelatin, polyvinyl alcohol, cellulose derivative, polyacrylic acid polymer, ethylene imine, polyethylene oxide, polyacrylic amide, polystyrene sulfonate, polyamidine, isoprene sulfonic acid polymer), and an aqueous emulsifiable material (e.g. fluororesin, silicone resin, acrylic resin, urethane resin, and epoxy resin).

The optical conductor layer 10 is a layer having an internal photoelectric effect and a characteristic such that its impedance changes depending on the illumination intensity of address light. AC operation is possible, symmetrical driving with respect to address light is preferred, and a three-layer structure is suitable in which a charge transport layer (CTL) is sandwiched between charge generation layers (CGL). In the exemplary embodiment, by way of example, the optical conductor layer 10 is configured such that a top charge generation layer 13, a charge transport layer 14, and a bottom charge generation layer 15 are laminated in the named order as viewed from the upper layer in FIG. 1.

The charge generation layers 13, 15 are layers having a function of generating light carrier by absorbing address light. Principally, the charge generation layer 13 controls the quantity of light carrier flowing in a direction from the transparent electrode 5 on the display surface side to the transparent electrode 6 on the writing side, while the charge generation layer 15 controls the quantity of light carrier flowing in a direction from the transparent electrode 6 on the writing surface side to the transparent electrode 5 on the display side. Preferably, the charge generation layers 13, 15 are capable of absorbing address light and generating exciters, and causing them efficiently separated to be free carriers in the charge generation layer or at the interface between the charge generation layer and the charge transport layer.

The charge generation layers 13, 15 may be formed by a dry process in which a charge generation material (e.g. metal or nonmetallic phthalocyanine, squarium compound, azulenium compound, perylene pigment, indigo pigment, bis or tris azo pigment, quinacridone pigment, pyrrolopyrrole pigment, polycyclic quinone pigment, dibromoanthoanthrone and other condensed ring aromatic pigment, cyanine pigment, xanthene pigment, polyvinyl carbazole and nitrofluorene or charge transfer complex, or eutectic complex of pyrilium salt dye and polycarbonate resin) is directly formed into a film, or by a wet application process in which such a charge generation material is dispersed or dissolved in a suitable solvent together with a high polymer binder (e.g. polyvinyl butyral resin, polyallylate resin, polyester resin, phenol resin, vinyl carbazole resin, vinyl formal resin, partially modified vinyl acetal resin, carbonate resin, acrylic resin, vinyl chloride resin, styrene resin, vinyl acetate resin, vinyl acetate resin, silicone resin) to prepare a coating solution, and the coating solution is applied and dried to form a film.

The charge transport layer 14 is a layer having a function such that light carrier generated in the charge generation layers 13, 15 is injected therein and drifted in the direction of an electric field provided by a bias signal. Generally, since the charge transport layer has a thickness of several tens of times that of the charge generation layer, the capacity, dark current, and internal light carrier of the charge transport layer 14 determine the light and dark impedance of the entire optical conductor layer 10.

Preferably, the charge transport layer 14 is such that injection of free carriers from the charge generation layers 13, 15 efficiently occurs (preferably it is close to the charge generation layers 13, 15 in terms of ionization potential), and the injected free carriers perform hopping movement as fast as possible. To increase the dark impedance, the dark current resulting from heat carriers should preferably be as low as possible.

The charge transport layer 14 may be formed by a process in which a material prepared by dispersing or dissolving a low molecular hole transport material (e.g. trinitrofluorene compound, polyvinyl carbazole compound, oxadiazole compound, benzyl amino hydrazone or quinoline hydrazone, other hydrazone compound, stilbene compound, triphenyl amine compound, triphenyl methane compound, benzidine compound) or a low molecular electron transport material (e.g. quinone compound, tetracyano quinodimethane compound, fluorenone compound, xanthone compound, benzophenone compound), dispersed or dissolved in a proper solvent together with high polymer binder (e.g. polycarbonate resin, polyarylate resin, polyester resin, polyimide resin, polyamide resin, polystyrene resin, crosslinking resin containing silicon) in a suitable solvent or a material prepared by dispersing or dissolving a high-polymer version of the hole transport material or electron transport material in a suitable solvent is applied and dried.

The colored layer (light shielding layer) 9 is a layer provided for the purpose of preventing error operation due to mutual interference by optically separating address light and incident light when writing is carried out, and for the purpose of preventing a decrease in image quality by optically separating a display image and external light entering from the non-display surface side of the display medium when a display is produced, although it is not an essential element in the present exemplary embodiment. However, it is preferable that this layer be provided to improve the performance of the display medium. From a view point of such a purpose, the colored layer 9 should possess a function of absorbing at least light in the absorption wavelength range of the charge generation layer, and light in the reflection wavelength range of the display layer.

Specifically, the colored layer 9 may be formed by a dry process in which an inorganic pigment (e.g. cadmium system, chrome system, cobalt system, manganese system, carbon system), or an organic dye or pigment (e.g. azo system, anthraquinone system, indigo system, triphenyl methane system, nitro system, phthalocyanine system, perylene system, pyrrolopyrrole system, quinacridone system, polycyclic quinone system, squarium system, azulenium system, cyanine system, piririum system, anthrone system) is directly formed into a film on the charge generation layer 13 side surface of the optical conductor layer 10, or by a wet application process in which a coating liquid prepared by dispersing or dissolving such a material in a suitable solvent together with a high polymer binder (e.g. polyvinyl alcohol resin, polyacrylic resin) is applied and dried so as to form a film.

The laminate layer 8 is a layer provided for the purpose of absorbing undulations and adhering when adhering function layers respectively formed on the inner surfaces of the upper and lower substrates, and it is not an indispensable element in the exemplary embodiment. The laminate layer 8 is made of a high polymer material having a low glass transition point, and a material capable of adhering and bonding the display layer 7 and colored layer 9 by heat or pressure may be selected. The material should be permeable to at least incident light.

Examples of preferred material for the laminate layer 8 include adhesive high polymer materials (e.g. urethane resin, epoxy resin, acrylic resin, silicone resin).

Figure 3:
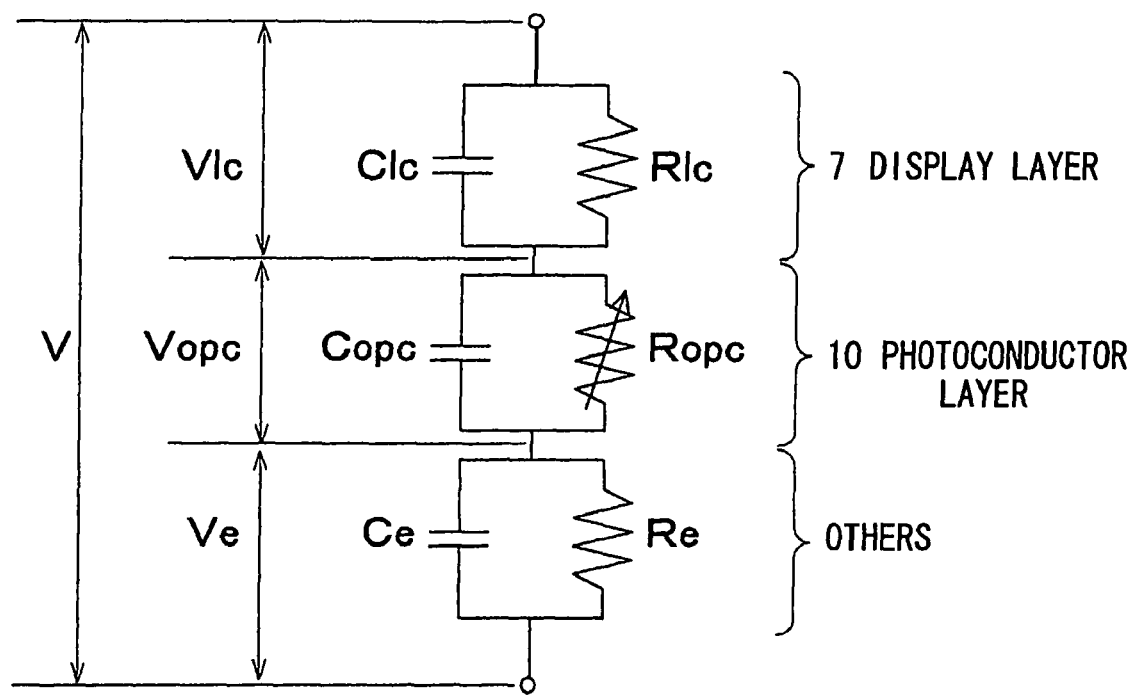
FIG. 3 is a circuit diagram of an equivalent circuit of an image display medium.

FIG. 3 is a circuit diagram of equivalent circuit of the display medium (liquid crystal device) 1 having the structure as shown in FIG. 1. Herein $C1c$, $Cop$, and $R1c$, $Ropc$ are electrostatic capacity and resistance values of the display layer 7 and optical conductor layer 10, respectively. $Ce$ and $Re$ are equivalent electrostatic capacity and equivalent resistance values of constituent elements other than the display layer 7 and optical conductor layer 10.

Assuming that a voltage V is applied between the transparent electrode 5 and transparent electrode 6 of the display medium 1 from the external writing device 2, divided voltages V1c, Vopc and Ve determined based on the impedance ratio of the respective constituent elements are applied to the respective constituent elements. More specifically, divided voltages determined based on the capacity ratio of the respective constituent elements occur immediately after the voltage is applied, and as time elapses, decrease down to divided voltages determined based on the resistance ratio of the respective constituent elements.

Since the resistance value Ropc of the optical conductor layer 10 varies depending on the intensity of address light, the effective voltage applied to the display layer 7 can be controlled depending on exposure and non-exposure. At the time of exposure, the resistance value Ropc of the optical conductor layer 10 is low, and the effective voltage applied to the display layer 7 is high, while at the time of non-exposure, the resistance value Ropc of the optical conductor layer 10 is high, and the effective voltage applied to the display layer 7 is low.

Next, the cholesteric liquid crystal (chiral nematic liquid crystal) 12 will be described specifically. The planar phase represented by the cholesteric liquid crystal 12 divides the light entering in parallel to the spiral axis into right-handed polarized light and left-handed polarized light, causes Bragg reflection of a circular polarized component coinciding with the spiral twisting direction, and passes the remaining light, which is known as a selective reflection phenomenon. The central wavelength λ of reflected light and reflection wavelength width Δλ are respectively expressed as λ=n·p, Δλ=Δn·p, where p is the spiral pitch, n is the average refractive index in a plane orthogonal to the spiral axis, and Δn is birefringence. Light reflected by cholesteric liquid crystal layer of planar phase represents a sharp color which depends on the spiral pitch.

Figure 4A:
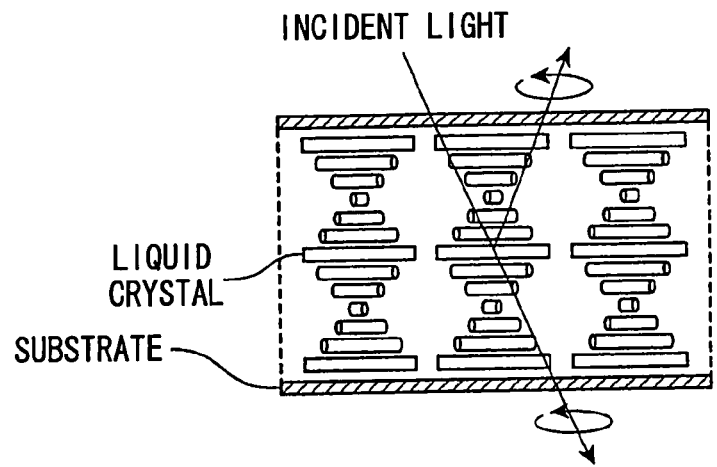
FIG. 4A is a schematic explanatory diagram showing the relation of the molecular orientation and the optical characteristic of cholesteric liquid crystal in a planar phase.
Figure 4B:
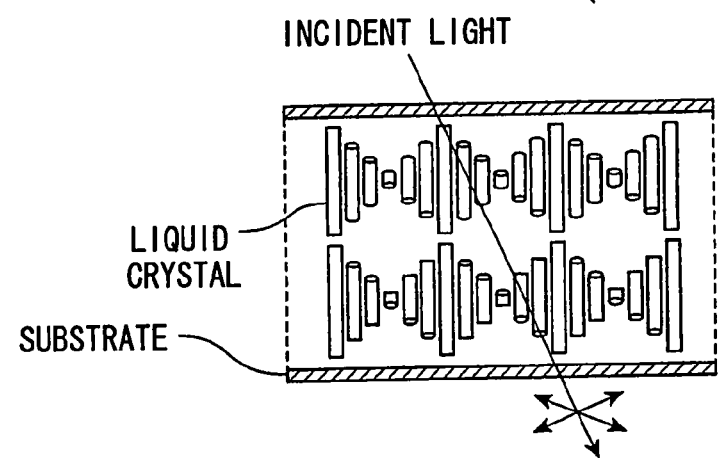
FIG. 4B is a schematic explanatory diagram showing the relation of the molecular orientation and the optical characteristic of cholesteric liquid crystal in a focal conic phase.
Figure 4C:
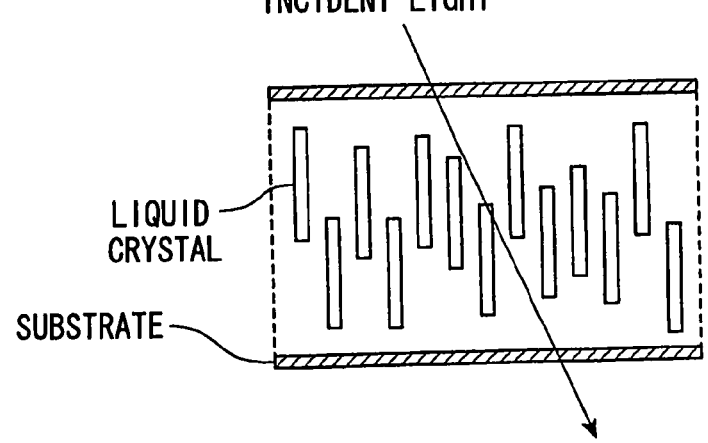
FIG. 4C is a schematic explanatory diagram showing the relation of the molecular orientation and the optical characteristic of cholesteric liquid crystal in a homeotropic phase.

The cholesteric liquid crystal having positive dielectric anisotropy represents three phases such as: planar phase in which the spiral axis is perpendicular to the cell surface, and the above-mentioned selective reflection phenomenon occurs with respect to the incident light, as shown in FIG. 4A; focal conic phase in which the spiral axis is approximately parallel to the cell surface, and the incident light is passed while being scattered forward slightly, as shown in FIG. 4B; and homeotropic phase in which the spiral structure is broken, the liquid crystal director is oriented in the electric field direction, and the incident light is passed substantially completely, as shown in FIG. 4C.

Of these three phases, the planar phase and focal conic phase can bistably exist in a field-free state. Therefore, the phase state of cholesteric liquid crystal is not determined primarily with respect to the electric field intensity applied to the liquid crystal layer. In an initial stage of planar phase, as the electric field intensity increases, the planar phase, focal conic phase, and homeotropic phase are changed in the named order, and in an initial stage of focal conic phase, as the electric field intensity increases, the focal conic phase and homeotropic phase are changed in the named order.

On other hand, when the electric field intensity applied to the liquid crystal layer is suddenly decreased down to zero, the planar phase and focal conic phase remain unchanged, while the homeotropic phase is changed to planar phase.

Figure 5:
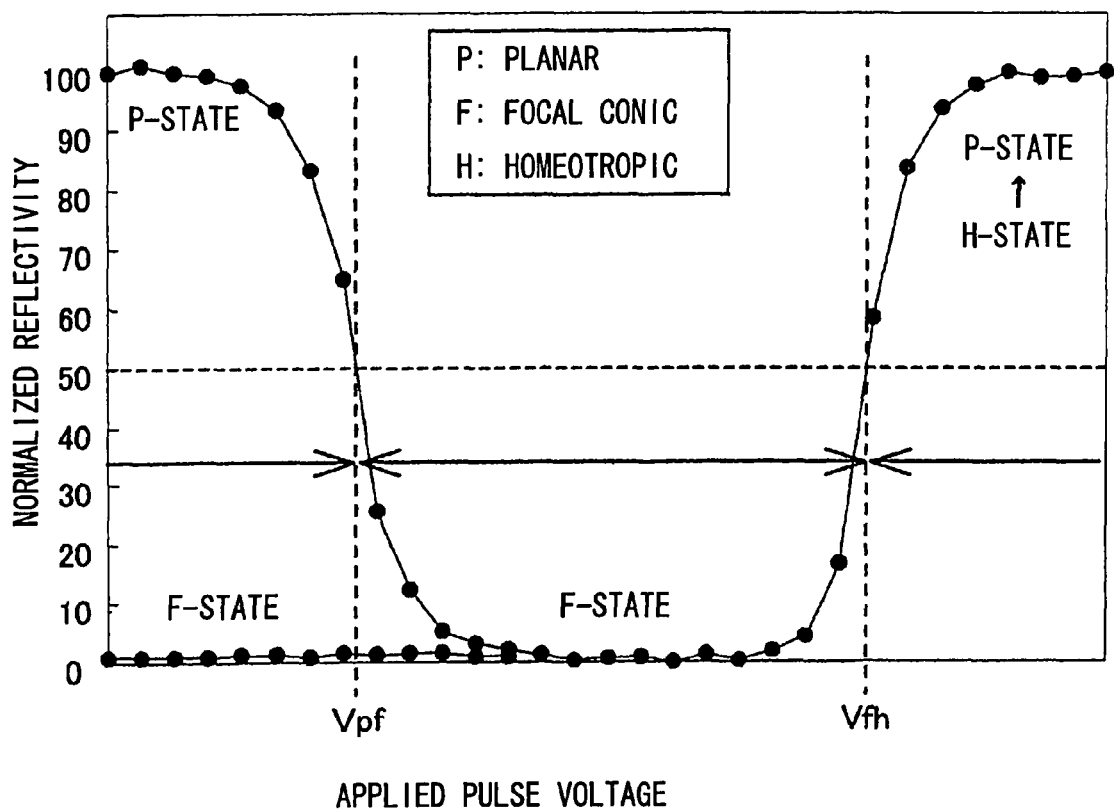
FIG. 5 is a graph illustrating the switching behavior of cholesteric liquid crystal.

Thus, after application of pulse signal, the cholesteric liquid crystal layer exhibits a switching behavior as shown in FIG. 5. When the voltage of the applied pulse signal is equal to or higher than Vfh, a selective reflection state occurs in which the homeotropic phase is changed to planar phase; when the voltage of the applied pulse signal is intermediate between Vpf and Vfh, a passing state occurs due to the focal conic phase; and when the voltage of the applied pulse signal is equal to or lower than Vpf, the state before the application of the pulse signal is maintained, that is, either a selective reflection state due to the planar phase or a passing state due to the focal conic phase occurs.

In the diagram, the vertical axis represents the normalized reflectivity, in which the reflectivity is normalized with the maximum reflectivity as 100 and with the minimum reflectivity as 0. Since a transition region exists among the planar phase, the focal conic phase, and the homeotropic phase, a case in which the normalized reflectivity is equal to or higher than 50 is defined as a selective reflection state while a case in which the normalized reflectivity is lower than 50 is defined as a passing state, wherein the threshold voltage for the phase change between planar phase and focal conic phase is assumed to be Vpf, and the threshold voltage for the phase change between focal conic phase and homeotropic phase is assumed to be Vfh.

Particularly in a liquid crystal layer of PNLC (polymer network liquid crystal) structure in which network resin is contained in continuous phase of cholesteric liquid crystal or PDLC (polymer dispersed liquid crystal) structure in which cholesteric liquid crystal is disperses in a droplet form in high polymer skeleton (including microcapsule structure), the field-free bistability of planar phase and focal conic phase is increased due to interference (anchoring effect) of the interface between the cholesteric liquid crystal and the high polymer, and the state right after application of pulse signal can be maintained for a long period of time.

In the display medium 1 using such cholesteric liquid crystal 12, by utilizing a bistable phenomenon of cholesteric liquid crystal, (A) selective reflection state due to planar phase, and (B) passing state due to focal conic phase can be switched over so as to achieve monochromatic display having field-free memory function or color display having field-free memory function.

Depending on the magnitude of external applied voltage, when the planar phase state (P state) or homeotropic phase state (H state) is the initial state, the cholesteric liquid crystal 12 changes to P state, to focal conic phase state (F state), and to H state, while when F state is the initial state, it changes to F state and to H state. When the final state is P state or F state, it is maintained even after the applied voltage is removed, while when the final state is H state, a phase change to P state is caused. Therefore, regardless of exposure and non-exposure, depending on the magnitude of applied voltage, P state or F state is selected as final phase state. As shown in FIG. 5, a light reflecting state occurs in P state, and a light passing state occurs in F state.

Next, the image display device 20 shown in FIG. 2 is described. The image display device 20 is structured to include the display medium 1 and optical recording apparatus 2.

The optical recording apparatus 2 is an apparatus for writing (recording) an image in the display medium 1, and includes a light irradiation unit (exposure device) 32 that irradiates an address light to the display medium 1, a drive unit 24 that displacing the light irradiation unit in the direction of arrow A in the diagram so that the light irradiation unit 32 and display medium 1 are fed relative to each other, a voltage application unit 26 composed of high voltage pulse generating units 26A, 26B that generate a bias voltage (high voltage pulse) to be applied to the display medium 1, a change-over unit 28 that changes over divided electrodes to which are applied bias voltages generated by the high voltage pulse generating units 26A, 26B, and a control unit 30 that controls the drive unit 24 and the changeover unit 28.

The light irradiation unit 32 is structured to include a reset light source 32A that irradiates a reset light for resetting (initializing) the display medium 1, and an image light source 32B for irradiating an address light pattern (optical image pattern) based on an input signal corresponding to an image from the control unit 30 onto the display medium 1 (specifically onto the photoconductor layer 10).

Resetting (initializing) the display medium 1 refers specifically to initializing the orientation of liquid crystals in the cholesteric liquid crystal 12, for example, realizing F state or P state.

The address light that is irradiated by the image light source 32B is preferably a light having a peak intensity within the absorption wavelength range of the photoconductor layer 10, and as narrow in bandwidth as possible.

The image light source 32B uses, for example, a one-dimensional array arrangement of a light source such as cold cathode tube, xenon lamp, halogen lamp, light emitting diode (LED), EL, laser or the like or a combination with polygon mirror, which is capable of forming arbitrary two-dimensional light emission patterns by a scanning operation.

The reset light source 32A uses, for example, an array arrangement of a light source such as mentioned above or a combination with a light conducting pate, which is capable of irradiating uniform light onto the display medium 1.

The high voltage pulse generating unit 26A is a circuit generating a reset voltage, and the high voltage pulse generating unit 26B is a circuit generating an image writing voltage. The high voltage pulse generating units 26A, 26B use high voltage amplifiers or the like which generate voltages of reverse polarities.

In the present exemplary embodiment, as shown in FIG. 2, the transparent electrode 6 of the display medium 1 is grounded. The high voltage pulse generating unit 26A outputs a DC voltage of positive polarity, while the high voltage pulse generating unit 26B outputs a DC voltage of negative polarity. That is, the reset voltage applied to the grounded transparent electrode 6 becomes a DC voltage of negative polarity with respect to the, while the image writing voltage applied to the grounded transparent electrode 6 becomes a DC voltage of positive polarity with respect to the divided electrodes 5A, 5B, 5C.

The reset voltage is set to be a voltage capable of resetting (initializing) the display medium 1 when the reset voltage is applied to the transparent electrodes while the reset light is being irradiated onto the display medium 1 from the reset light source 32A. More specifically, the reset voltage is set to be a voltage capable of initializing the orientation of liquid crystals of the cholesteric liquid crystal 12. For example, when initialization into F state is carried out, as shown in FIG. 5, the voltage (divided voltage) which is applied to the display layer 7 is a voltage higher than Vpf and lower than Vfh, and when initialization into P state is carried out, the voltage (partial voltage) which is applied to the display layer 7 is a voltage higher than Vfh.

The image writing voltage is set to be a voltage capable of recording an image in the display medium 1 when the image writing voltage is applied to the transparent electrodes while the image light is being irradiated onto the display medium 1 from the image light source 32B. For example, when an image is written by changing the orientation of liquid crystals of the cholesteric liquid crystal 12 from P state to F state, the voltage (divided voltage) which is applied to a portion the display layer 7 onto which the image light is irradiated is a voltage in a range higher than Vpf and lower than Vfh, while when the orientation of liquid crystals is changed from F state to P state, the voltage (partial voltage) which is applied to a portion the display layer 7 onto which the image light is irradiated is a voltage higher than Vfh.

The reset voltage may be a DC voltage of positive polarity, and the image writing voltage may be a DC voltage of negative polarity.

The changeover unit 28 selects the divided electrode for supplying a reset voltage, and the divided electrode for supplying an image writing voltage, according to an instruction from the control unit 30. Thus, the changeover unit 28 applies a reset voltage output from the high voltage pulse generating unit 26A to the divided electrode selected for applying a reset voltage, and applies an image writing voltage issued from the high voltage pulse generating unit 26B to the divided electrode selected for applying an image writing voltage.

The drive unit 24 causes the light irradiation unit 32 to be moved in the direction of arrow A in FIG. 2 (sub-scanning direction) according to an instruction from the control unit 30. The control unit 24 is structured to include, for example, a pulse motor by which the light irradiation unit 32 is driven to be moved in the direction of arrow A in the drawing. As a result, the reset light source 32A and image light source 32B are moved in unison with each other in the direction of arrow A in the drawing. With the structure in which the light irradiation unit 32 is moved, the structure for detecting the transparent electrode of display medium 1 is made unnecessary, and connection structure with the voltage application unit 26 is simplified as compared with the structure in which the display medium 1 is moved.

The control unit 30 instructs the drive unit 24 to move the light irradiation unit 32 at a specified speed in the direction of arrow A in FIG. 2, and controls the respective light sources, on the basis of input image data, to illuminate the display medium 1 by the rest light source 32A by irradiating the reset light at specified timing, and to illuminate the display medium 1 by the image light source 32B by irradiating image light according to the entered image data, and also controls the changeover unit 28 for applying the reset voltage and image writing voltage to the divided electrodes 5A to 5C at the timing as specified below.

Next, the integral reflectivity characteristic of display medium 1 (cholesteric liquid crystal 12) is described with respect to a case in which a image is written after the display medium 1 is reset, and a case in which an image is written without resetting the display medium 1.

The inventors have measured the integral reflectivity of display medium 1 with respect to: a case where a reset voltage whose polarity is reserve to that of the image writing voltage is applied to the display medium 1, a reset light is irradiated to reset the display medium 1 (photo reset in reverse polarity), then an image writing voltage is applied to the display medium 1, and an image light is irradiated to write an image in the display medium 1; a case where a reset voltage whose polarity is the same as that of the image writing voltage is applied to the display medium 1, a reset light is irradiated, the display medium 1 is reset (photo reset in same polarity), then an image writing voltage is applied to the display medium 1 and an image light is irradiated to write an image in the display medium; a case where an image writing voltage is applied to the display medium 1 without resetting the display medium 1, and an image light is irradiated to write an image in the display medium 1; and a case where a reset voltage whose polarity is reverse to that of the image writing voltage is applied to the display medium 1 without irradiating reset light (dark reset in reverse polarity), then an image writing voltage is applied to the display medium 1, and an image light is irradiated to write an image in the display medium 1.

Figure 6:
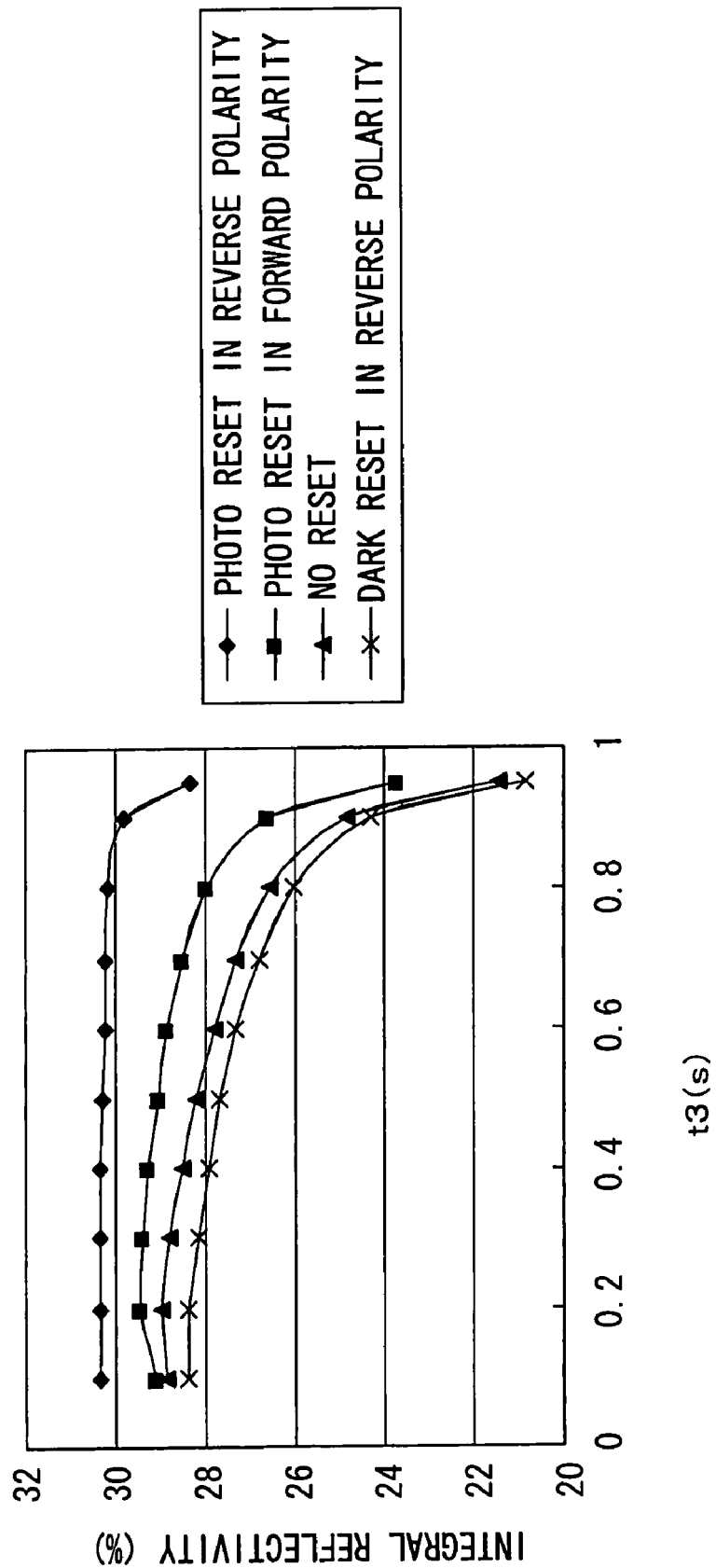
FIG. 6 is a graph illustrating the integral reflectivity characteristic of cholesteric liquid crystal.

FIG. 6 shows results for cases where photo reset in reverse polarity, photo reset in forward polarity, no reset, and dark reset in reverse polarity are carried out.

Figure 7:
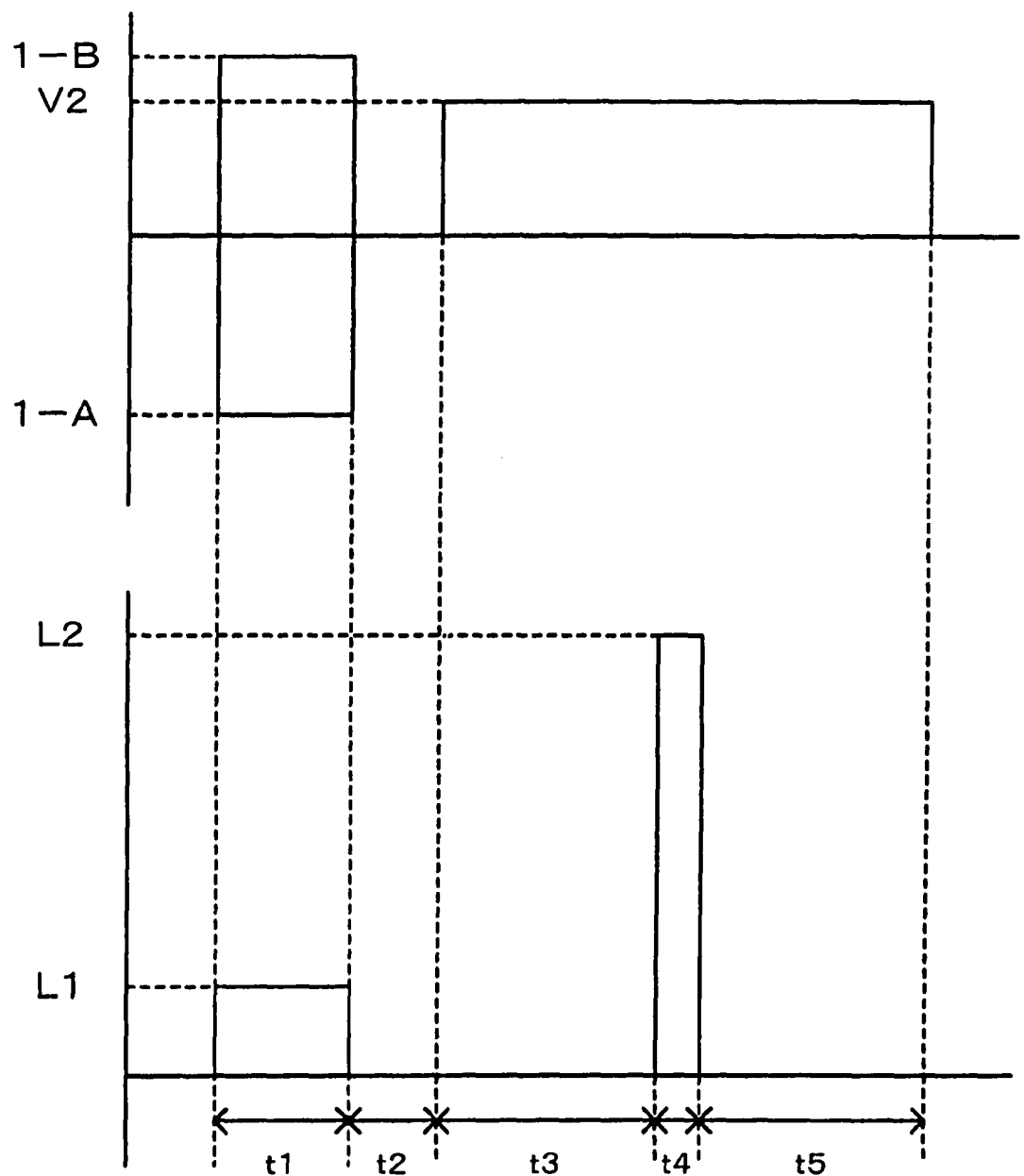
FIG. 7 is a timing chart of voltage application and light irradiation.

Voltage application and light irradiation are carried out with such as timing as shown in FIG. 7. As shown in the diagram: in the case of photo reset in reverse polarity and dark reset in reverse polarity, a reset voltage V1-A (for example, −450 V) is applied to the display medium 1 for a period t1 (for example, 200 ms); in the case of photo reset in forward polarity, a reset voltage V1-B (for example, −450 V) is applied to the display medium 1; and in the case of photo reset in reverse polarity and photo reset in forward polarity, a reset light L1 (for example, 100 µW) is irradiated onto the display medium 1. In the case where no reset is carried out, neither reset voltage nor reset light is applied for the period t1, In the case where photo reset or dark reset is carried out, after a lapse of a period t2 (for example, 100 ms), an image writing voltage V2 (for example, 400 V) is applied to the display medium 1 for the period of t3 to t5 (for example, 1000 ms), and an image light L2 (for example, 400 µW) is irradiated onto the display medium 1 for the period t4 (for example, 10 ms).

FIG. 6 shows integral reflectivity characteristics of display medium 1 when the period t3 in FIG. 7 is varied.

As shown in FIG. 6, in the case where photo reset in reverse polarity is carried out, the integral reflectivity exhibits almost no change until the period t3 reaches about 800 ms, that is, until a period of about 800 ms elapses from the start of application of the image writing voltage V2, while in the other cases, the integral reflectivity decreases gradually from the onset of application of image writing voltage V2.

Therefore, in the present exemplary embodiment, as reset voltage, a DC voltage of a polarity reverse to that the image writing voltage is applied as a reset voltage to the display medium 1, and then the image writing voltage is applied to the display medium 1. By carrying out such photo reset in reverse polarity, the orientation of cholesteric liquid crystal 12 is initialized, so that the reflectivity of cholesteric liquid crystal 12 is stabilized regardless of the image recorded in the display medium 1 before the reset. If a voltage of same polarity is continuously applied, then there may be a possibility that ion motion in the display medium 1 is offset so as to affect the reliability of the display; however, the photo reset in reverse polarity leads to a decrease in occurrence of such a possibility. Moreover, the optical writing type display medium 1 has a tendency that charge is generated by the photoconductor layer 10, and the charge is accumulated inside the display medium 1, but such tendency is alleviated by the photo reset in reverse polarity.

Further, as shown in FIG. 6, when t3 is set to be equal to or longer than 800 ms, the integral reflectivity begins to drop sharply, more or less, in all cases. Assuming that t3 when the integral reflectivity begins to drop sharply is Ta (s), and the moving speed (sub-scanning speed) of the light irradiation unit 32 is Va (mm/s), if the electrode width W of the divided electrode is Ta×Va (mm) or less, sudden drop of integral reflectivity can be prevented, while if the electrode width W of the divided electrode is larger than Ta×Va, it is required that the period of t3+t4+t5 be increased in order to prevent the integral reflectivity from being decreased.

Figure 8:
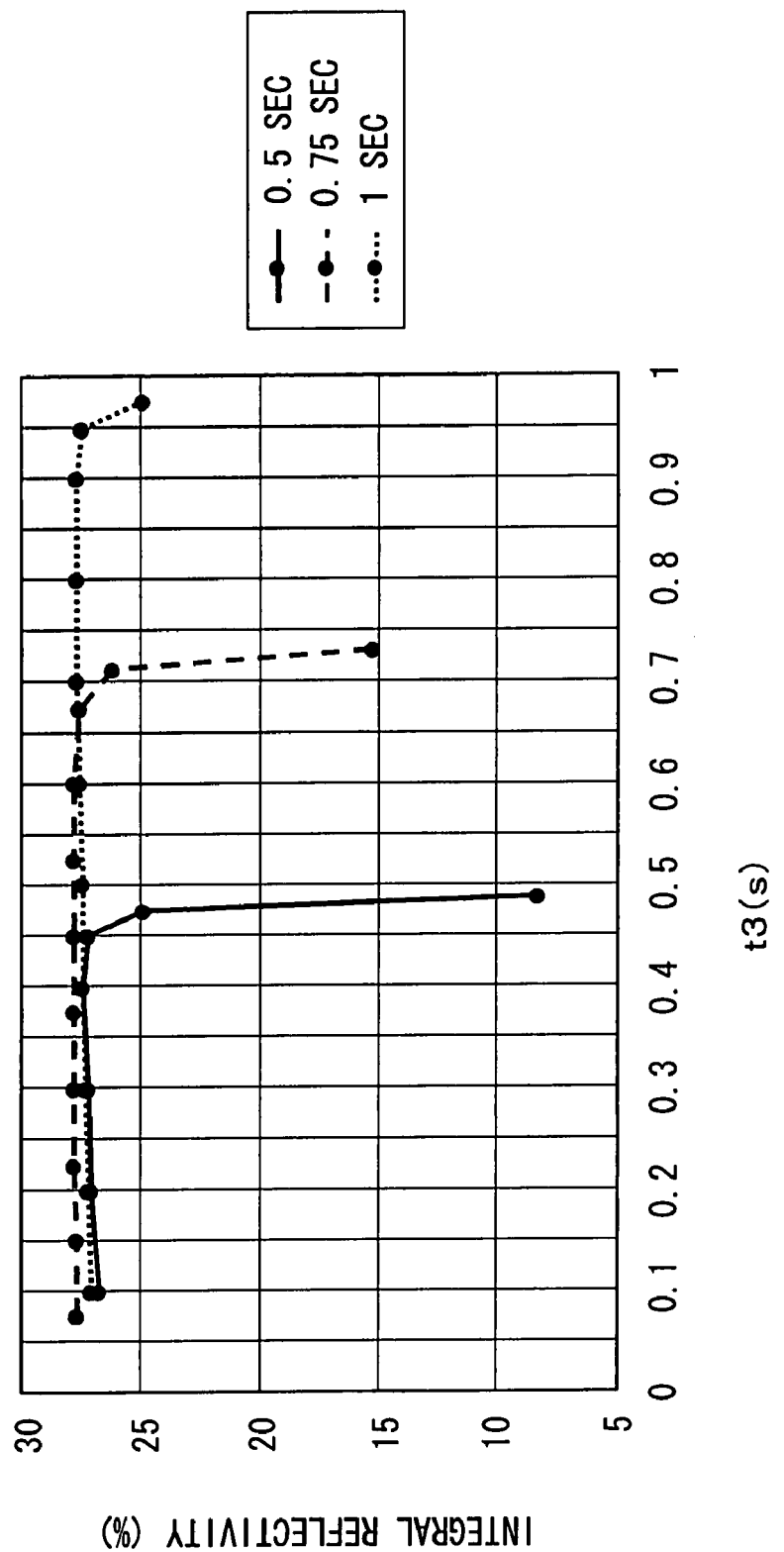
FIG. 8 is a graph illustrating the integral reflectivity characteristic of cholesteric liquid crystal.

FIG. 8 shows the integral reflectivity characteristics when the period of t3+t4+t5 in FIG. 7 is set to be 0.5 (s), 0.75 (s), and 1 (s). As shown in the diagram, in the case where the period t3+t4+t5 is 0.5 (s), the integral reflectivity drops rapidly when t3 exceeds 0.45 (s). In the case where t3+t4+t5 is 0.75 (s), as far as t3 is about 0.65 (s) or less, the integral reflectivity does not drop when t3 is shorter than about 0.65(s). Further, in the case where t3+t4+t5 is 1 (s), the integral reflectivity does not drop when t3 is shorter than about 0.9(s). Thus, by continuing the application of the image writing voltage for an extra period of about Ta+0.1 (s), it is possible to prevent the integral reflectivity from dropping. Therefore, in the present exemplary embodiment, after a lapse of the image light irradiation period, the application of the image writing voltage is continued for a predetermined period enough to suppress drop of the integral reflectivity.

Next, description is given of an image writing operation with respect to the display medium 1. It is assumed that the electrode width W of divided electrodes 5A, 5B, 5C is the same, and that W<Ta×Va. Further, it is assumed that the high voltage pulse generating unit 26A outputs a reset voltage V1-A, and the high voltage pulse generating unit 26B outputs an image writing voltage V2.

Figure 9:
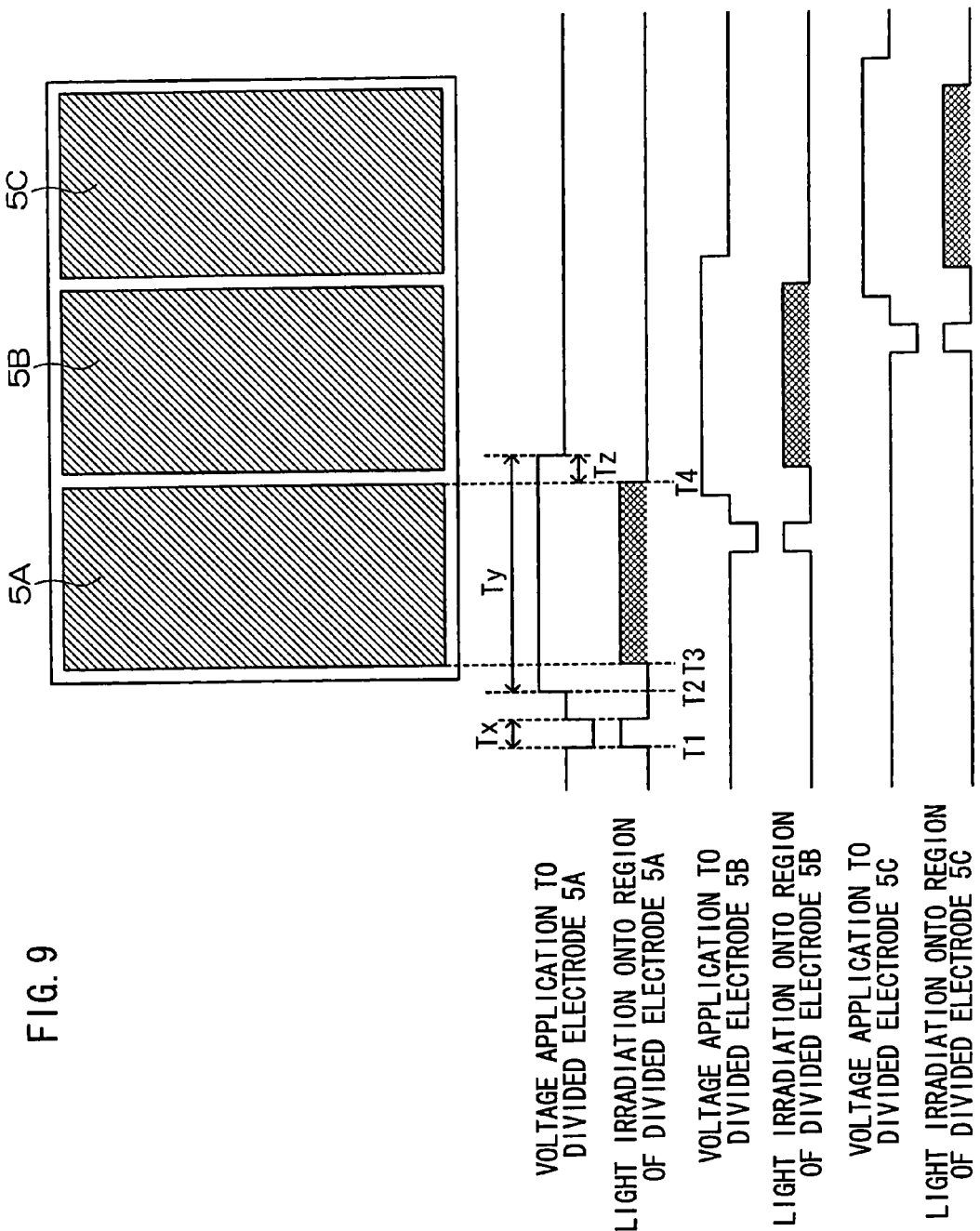
FIG. 9 is a timing chart of voltage application and light irradiation.

FIG. 9 shows the timing of irradiating reset light and image light onto the display medium 1, and the timing of applying a voltage to the display medium 1.

The control unit 30 instructs the drive unit 24 such that the light emitting unit 32 starts to move in the direction of arrow A in FIG. 2. The light irradiation unit 32 is located at a waiting position before the image writing operation is started. This waiting position is more upstream than the upstream side end in the direction of arrow A of the display medium 1.

When the control unit 30 instructs the drive unit 24 to start to move the light irradiation unit 32. As a result, the light irradiation unit 32 starts to move in the direction of arrow A in FIG. 2 at a predetermined moving speed Va.

The control unit 30 instructs the changeover unit 28 such that a reset voltage V1-A is applied to the divided electrode 5A for a specified time Tx at a point of time T1 when the reset light source 32A reaches the region of the divided voltage 5A and reset light can be irradiated onto at least part of the region of the divided voltage 5A, and also instructs the reset light source 32A such that reset light L1 is irradiated onto the region of the divided electrode 5A for a specified time Tx. The specified time Tx is set to be a time for which the reset light is irradiated onto the whole region of the divided electrode 5A.

As a result, the changeover unit 28 selects the divided electrode 5A, and applies the reset voltage V1-A outputted from the high voltage pulse generating unit 26A to the divided electrode 5A for the specified time Tx, and the reset light source 32A irradiates the reset light L1 onto the display medium 1 for the specified time Tx, so that the display medium 1 is reset. for example, to F state.

When the reset is finished, the control unit 30 instructs the changeover unit 28 such that the image writing voltage V2 is applied to the divided electrode 5A for a specified time Ty, at a point of time T2 prior to a point of time T3 when the period for irradiating image light by the image light source 32B starts, that is, at a point of time before the image light source 32B reaches the end of upstream side in the direction of arrow A of the divided electrode 5A. As a result, the changeover unit 28 applies the image writing voltage V2 outputted from the high voltage pulse generating unit 26B to the divided electrode 5A for the specified time Ty. Application of the image writing voltage V2 may be started at the point of time T3 when the period for irradiating image light by the image light source 32B starts, and by staring application of voltage at the point of time T2 prior to T3, it is possible to prevent occurrence of a region in which no recording image is recorded so that the image is written with certainty.

The control unit 30 outputs to the image light source 32B the image data of the image to be written in the region of the divided electrode 5A of the input image data during the period from the point of time T3 when the period for irradiating image light by the image light source 32B starts to a point of time T4 when the period for irradiating image light ends, that is, during a period of time from a point of time when the image light source 32B reaches the upstream side end in the direction of arrow A of the divided electrode 5A to a point of time when the image light source 32B reaches the downstream side end in the direction of arrow A of the divided electrode 5A. As a result, the image light is irradiated during the image light irradiating period from T3 to T4, and the image is written in. For example, the region onto which the image light is irradaited is changed from F state to H state. Needless to say, the image light irradiating period is the period during which image light can irradiated, and no image light is irradiated onto the region where no image is written.

As shown in FIG. 9, even after the image light irradiating period (period from T3 to T4) is over, application of the image writing voltage V2 is continued for a specified time Tz, so that drop of the integral reflectivity is suppressed. The specified time Tz is set to be a time capable of suppressing drop of integral reflectivity (for example, 100 ms or more). When application of the image writing voltage V2 is over, the region of H state is changed to P state, and the image is displayed and maintained at the region of the divided electrode 5A.

The control unit 30 controls the drive unit 24, light emitting unit 32, and changeover unit 28 sequentially with respect to the divided electrodes 5B, 5C in a manner similar to the above. Consequently, an image is written in the entire display medium 1.

Although, in the present exemplary embodiment, description has been made of the case where the display layer is a cholesteric liquid crystal, the present invention is by no means limited thereto and may use a ferrodielectric liquid crystal.

Further, although, in the present exemplary embodiment, description has been made of the case where the light irradiation unit 32 and display medium 1 are relatively fed by displacing the light irradiation unit 32 with the display medium 1 fixed, it is also possible that the display medium 1 may be moved with the light irradiation unit 32 fixed, or that but the two components may be relatively moved by moving them.

Further, although, in the present exemplary embodiment, description has been made of the case where the number of the divided electrodes is bee three (3), the invention may be equally applicable in a case where the number of the divided electrodes is two (2) or equal to or more than four (4).

Still further, although, in the present exemplary embodiment, description has been made of the case where the operations such as application of reset voltage, irradiation of reset light, application of image writing voltage, and irradiation of image light are performed sequentially with respect to the respective divided electrodes in a predetermined direction, it is to be understood the above operations need not be performed sequentially with respect to adjacent ones of the divided electrodes. For example, when the entire region of a certain divided electrode is not needed to write an image, the operations need not be performed with respect to that divided electrode, and may be performed starting with the next divided electrode. It is possible that the above operations may be performed with respect to the entire display medium 1 for every other n divided electrodes (n=1, 2, 3, . . . ) and similar operations may be repeated with respect to the divided electrodes which have not been subjected to the above operations. That is, it is possible that the display medium 1 may be scanned n+1 times to write in an image.

What is claimed is:

1. An optical recording apparatus for recording an image in an optical writing image display medium comprising a display layer including cholesteric liquid crystal which has a memory function and reflects incident light selectively depending on an applied voltage, a photoconductor layer whose electrical resistance changes depending on irradiated writing light, and a pair of electrodes composed of a plurality of divided electrodes and having the display layer and the photoconductor layer interposed therebetween, at least one electrode of the pair of electrodes being arranged in parallel along a specified direction, the apparatus comprising:

an electrode selection unit that selects any one of the plurality of divided electrodes according to a predetermined sequence along the specified direction;

a first light irradiation unit that irradiates reset light for initializing the display layer onto the photoconductor layer in a region corresponding to the one of the divided electrodes selected by the electrode selection unit;

a second light irradiation unit that irradiates image light corresponding to input image information onto the one of the divided electrodes selected by the electrode selection unit in an irradiating area having a width narrower than a width of the one of the divided electrode;

a relative feeding unit that causes the optical writing type image display medium and a light irradiation section that includes the first and second light irradiation units to be fed relatively along the specified direction;

a first voltage application unit that continuously applies a substantially constant first DC voltage of a first polarity during the irradiation of the reset light to a whole part of the one of the divided electrode, as a reset voltage for initializing the display layer, to the one of the divided electrodes selected by the electrode selection unit;

a second voltage application unit that continuously applies a substantially constant second DC voltage of a second polarity opposite to the first polarity during the irradiation of image light to whole part of the one of the divided electrode, as an image writing voltage for writing an image in the display layer, to the one of the divided electrodes selected by the electrode selection unit; and a control unit that controls the first voltage application unit and the first light irradiation unit such that the reset voltage is applied to the one of the divided electrodes selected by the electrode selection unit and the reset light is irradiated onto the photoconductor layer in the region corresponding to the one of the divided electrodes selected by the electrode selection unit, and further controls the second voltage application unit and the second light irradiation unit such that the image writing voltage is applied to the one of the divided electrodes selected by the electrode selection unit and the image light is scanned over the photoconductor layer in the region corresponding to the one of the divided electrodes selected by the electrode selection unit, wherein the image light irradiates the photoconductive layer dividedly within the one of the plurality of divided electrodes by shifting the irradiated area along the feeding directions by the relative feeding unit.

2. The optical recording apparatus of claim 1, wherein the relative feeding unit is a light irradiation unit feeding unit that causes the light irradiation unit to be fed along the specified direction.

3. The optical recording apparatus of claim 2, wherein the control unit controls the second voltage application unit such that application of the image writing voltage is continued for a specified time after an irradiation period of the image light has elapsed.

4. The optical recording apparatus of claim 2, wherein the control unit controls the second voltage application unit such that application of the image writing voltage is started before an irradiation period of the image light is started.

5. An image display apparatus comprising:
an optical writing image display medium comprising a display layer having a memory function and configured to reflect incident light selectively depending on an applied voltage, a photoconductor layer whose electrical resistance changes depending on irradiated writing light, and a pair of electrodes composed of a plurality of divided electrodes and having the display layer and the photoconductor layer interposed therebetween, at least one electrode of the pair of electrodes being arranged in parallel along a specified direction; and
the optical recording apparatus of claim 2.

6. The optical recording apparatus of claim 1, wherein the control unit controls the second voltage application unit such that application of the image writing voltage is continued for a specified time after an irradiation period of the image light has elapsed.

7. The optical recording apparatus of claim 6, wherein the control unit controls the second voltage application unit such that application of the image writing voltage is started before an irradiation period of the image light is started.

8. An image display apparatus comprising:
an optical writing image display medium comprising a display layer having a memory function and configured to reflect incident light selectively depending on an applied voltage, a photoconductor layer whose electrical resistance changes depending on irradiated writing light, and a pair of electrodes composed of a plurality of divided electrodes and having the display layer and the photoconductor layer interposed therebetween, at least one electrode of the pair of electrodes being arranged in parallel along a specified direction; and
the optical recording apparatus of claim 6.

9. The optical recording apparatus of claim 1, wherein the control unit controls the second voltage application unit so as to start application of the image writing voltage before an irradiation period of the image light is started.

10. An image display apparatus comprising:
an optical writing image display medium comprising a display layer having a memory function and configured to reflect incident light selectively depending on an applied voltage, a photoconductor layer whose electrical resistance changes depending on irradiated writing light, and a pair of electrodes composed of a plurality of divided electrodes and having the display layer and the photoconductor layer interposed therebetween, at least one electrode of the pair of electrodes being arranged in parallel along a specified direction; and
the optical recording apparatus of claim 9.

11. An image display apparatus comprising:
an optical writing image display medium comprising a display layer having a memory function and configured to reflect incident light selectively depending on an applied voltage, a photoconductor layer whose electrical resistance changes depending on irradiated writing light, and a pair of electrodes composed of a plurality of divided electrodes and having the display layer and the photoconductor layer interposed therebetween, at least one electrode of the pair of electrodes being arranged in parallel along a specified direction; and
the optical recording apparatus of claim 1.

12. The optical recording apparatus of claim 1, wherein the width of the one of the divided electrodes is less than a product of a time in which the integral reflectivity of the cholesteric liquid crystal sharply drops and a moving speed of the relative feed unit.

13. An optical recording method for recording an image in an optical writing image display medium comprising a display layer including a cholesteric liquid crystal which has a memory function and reflects incident light selectively depending on an applied voltage, a photoconductor layer whose electrical resistance changes depending on irradiated writing light, and a pair of electrodes composed of a plurality of divided electrodes and having the display layer and the photoconductor layer interposed therebetween, at least one electrode of the pair of electrodes being arranged in parallel along a specified direction, the method comprising:
continuously applying a substantially constant first DC voltage of a first polarity during the irradiation of the reset light, as a reset voltage for initializing the display layer, to a whole part of any one of the plurality of divided electrodes which is selected according to a predetermined sequence along the specified direction, and irradiating reset light to the photoconductor layer in a region corresponding to the selected one of the divided electrodes; and
continuously applying a substantially constant second DC voltage of a second polarity opposite to the first polarity, as an image writing voltage for writing an image in the display layer, to the whole part of the selected one of the plurality of divided electrodes, and irradiating image light corresponding to input image information in an irradiating area such that the image light is scanned over the optical conductor layer of the region corresponding to the whole part of the selected one of the plurality of divided electrodes, wherein
the continuous application of the substantially constant second DC voltage is performed during the irradiation of image light,
the image light irradiates the optical conductor layer dividedly within the whole part of the selected one of the plurality of divided electrodes by shifting the irradiated region along the specified direction, and
the irradiating area has a width narrower than a width of the selected one of the plurality of divided electrodes.

14. The optical recording method of claim 13, wherein the width of the one of the divided electrodes is less than a product of a time in which the integral reflectivity of the cholesteric liquid crystal sharply drops and a speed in which the irradiated region is shifted in the specified direction.

* * * * *